United States Patent [19]
Wanner et al.

[11] 3,812,983
[45] May 28, 1974

[54] APPARATUS FOR FEEDING BARS IN AUTOMATIC SINGLE-SPINDLE BAR MACHINES

[75] Inventors: Max Wanner, Esslingen; Erich Schaefer, Nabern/Teck, both of Germany

[73] Assignee: Index-Werke KG Hahn & Tessky, Esslingen, Germany

[22] Filed: Aug. 25, 1972

[21] Appl. No.: 283,701

[30] Foreign Application Priority Data
Sept. 3, 1971 Germany............................ 2144190

[52] U.S. Cl.................................... 214/1.2, 82/2.7
[51] Int. Cl............................................. B65h 5/16
[58] Field of Search ............... 214/1.1, 1.2, 1.3, 1.4, 214/1.5; 198/175, 211; 82/2.5, 2.7

[56] References Cited
UNITED STATES PATENTS
2,855,815   10/1958   Miller ............................ 214/1.5 X
3,041,904   7/1962   Konrad ........................... 214/1.2 X
3,693,810   9/1972   Gumhold ........................... 214/1.5

*Primary Examiner*—Frank E. Werner
*Attorney, Agent, or Firm*—Michael S. Striker

[57] ABSTRACT

Apparatus for feeding bars into the work spindle of a single spindle automatic has a package of bar-receiving tubes surrounding an elongated channel and being received in a tubular holder which is indexible by a fluid-operated ratchet and pawl mechanism to place selected tubes into register with the work spindle. Each tube has an elongated slot and receives a discrete bar pusher having a projection extending through the respective slot and into the channel. The shifting mechanism for the bar pushers has an endless chain one stretch of which extends lengthwise through the channel and carries a U-shaped entraining device which automatically engages the projection of the bar pusher in that tube which registers with the work spindle. The chain can be moved by a reversible electric motor which can be controlled by the programming system of the automatic, the same as the indexing mechanism.

14 Claims, 6 Drawing Figures

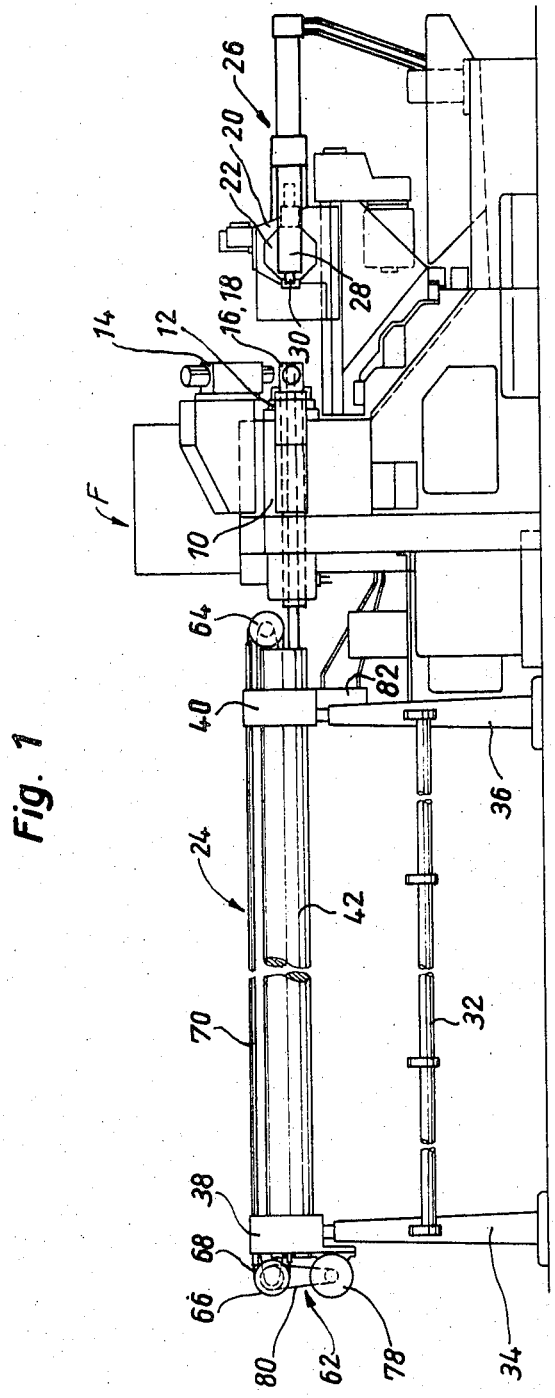

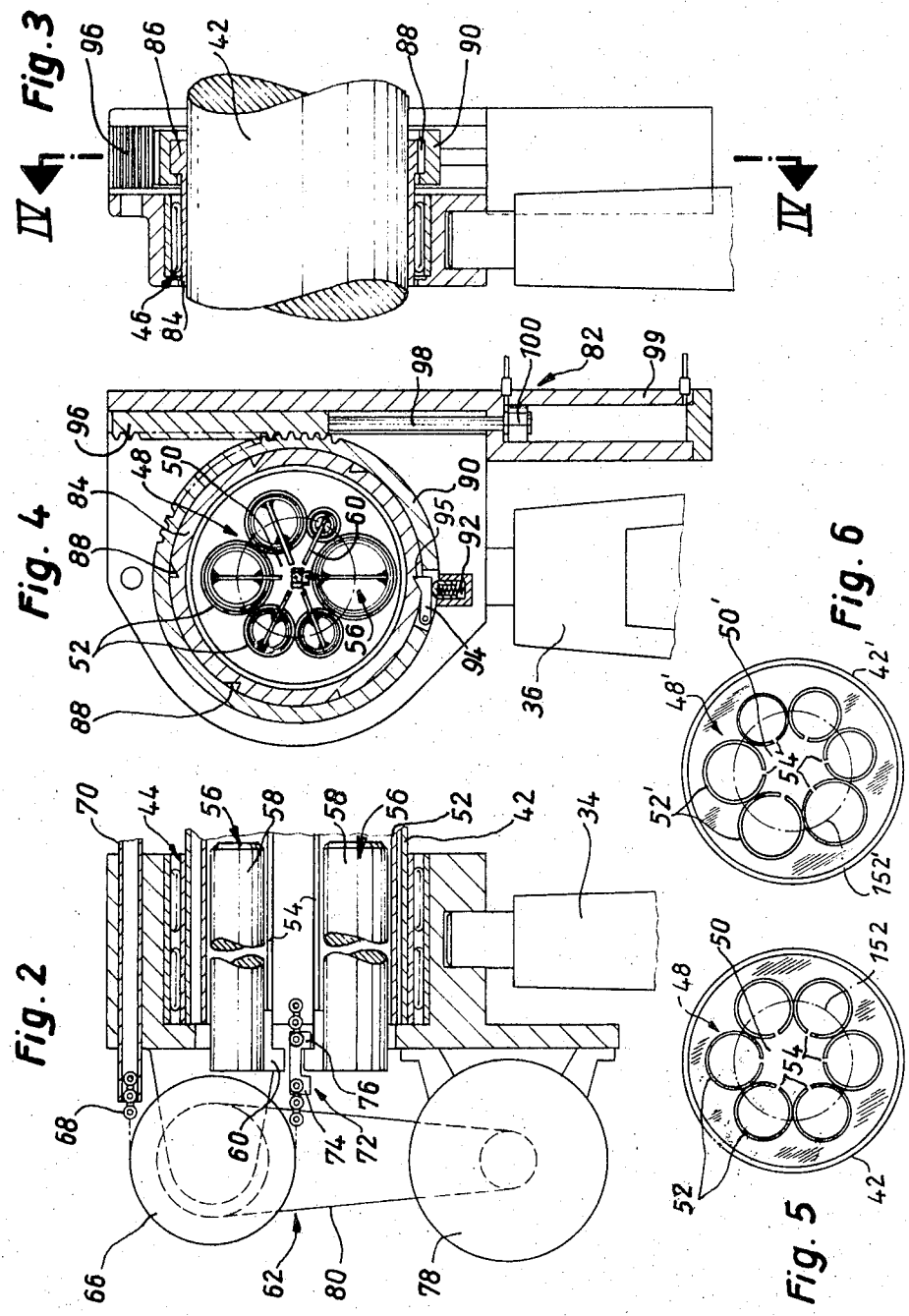

APPARATUS FOR FEEDING BARS IN AUTOMATIC SINGLE-SPINDLE BAR MACHINES

BACKGROUND OF THE INVENTION

The present invention relates to machine tools in general, and more particularly to improvements in apparatus which are utilized to feed bars to automatic bar machines, particularly to program-operated single-spindle automatics.

It is already known to utilize in connection with automatic bar machines a feeding apparatus having a set of slotted bar-receiving tubes which must be moved by hand in order to place a selected tube into register with the rear end of the hollow work spindle in the bar machine. Each tube is provided with a discrete bar pusher which extends through the slot of the respective tube and is fixed to a chain which can move the pusher forwardly to thereby shift the bar in the respective tube into and through the work spindle. Such manually movable sets of tubes are satisfactory for use with semiautomatic or fully automatic bar machines which are designed to turn out large numbers of identical articles so that the position of the tubes must be changed at infrequent intervals. Each tube of the set is designed to accommodate a bar of a given diameter so that an indexing of tubes becomes necessary when the setup or tooling of the machine is changed from the processing of bars having a first diameter to the processing of bars having another diameter.

The just described simple bar feeding apparatus is not suited for use with program-operated single-spindle automatics which do not require a manual change of setup, i.e., wherein the exchange or replacement of tools, changes in the speed of the work spindle, changes in the extent of movement of one or more tool slides and/or other modifications can be carried out in accordance with a predetermined schedule. The bar feeding apparatus which is associated with a program-operated automatic should be capable of rapid conversion from the feed of a first type of bars to the feed of one or more different types of bars with minimal losses in time, especially if the automatic is to turn out small batches of articles so that the program must be changed at frequent intervals.

It was already proposed to use with program-operated automatics a computer-controlled bar supplying apparatus which employs a magazine serving to store bars having different diameters and/or consisting of different materials, a bar feeder and a transfer mechanism which can withdraw selected bars from the magazine to deliver them into the bar feeder for introduction into the work spindle. The bar feeder advances the bars in stepwise fashion, i.e., through a predetermined distance after separation of a finished workpiece from the leading end of the bar which extends through the work spindle. Reference may be had to German printed publication No. 1,918,843. The just described bar supplying apparatus is rather bulky, complex and expensive because it consists of three discrete aggregates, namely, a magazine, a bar feeder and a transfer unit. Furthermore, the operation of such bar supplying apparatus is slow, especially if a bar which has been introduced into the work spindle is not to be consumed in its entirety; it is then necessary to expel the remnant of the incompletely consumed bar, either forwardly through the working station of the automatic or rearwardly through the bar feeder, with attendant losses in time and output.

SUMMARY OF THE INVENTION

An object of the invention is to provide a simple, compact and rugged bar feeding apparatus which is sufficiently versatile to be useful for introduction of bars into the work spindle of a program-operated automatic.

Another object of the invention is to provide a bar feeding apparatus wherein that device which constitutes a magazine for spare bars can serve as a component part of the means for guiding the bars during introduction into the work spindle.

A further object of the invention is to provide a bar feeding apparatus which need not be manipulated by hand, wherein all such units or mechanisms which move the bars into register with and/or into the work spindle can e operated in accordance with a predetermined schedule, and which can be converted from delivery of a first type of bars to delivery of a different type of bars with minimal losses in time so that it can be used with advantage for the feeding of bars to automatic machines, especially single-spindle automatics, which are intended for the making of short series of articles.

An additional object of the invention is to provide the improved bar feeding apparatus with novel and improved means for indexing the tubes which receive and guide the bars during movement into register with and thereupon into the work spindle.

Still another object of the invention is to provide or associate the bar feeding apparatus with novel and improved means for ejecting partially consumed bars from the work spindle.

The invention is embodied in a bar feeding apparatus for use with a machine having at least one hollow rotary work spindle, particularly with a program-operated single-spindle automatic. The feeding apparatus comprises a package of (for example, six) parallel bar-receiving tubes which form an annulus and surround an elongated passage or channel communicating with axially parallel slots one of which is provided in each tube, indexing means for rotating the package about an axis which extends lengthwise through the passage so that the package can assume a plurality of different positions in each of which the front end of a different tube registers with the work spindle, discrete bar pushers, one for each tube and each having a projection extending through the respective slot and into the passage, and shifting or advancing means for moving the bar pusher in that tube which registers with the work spindle. The shifting means comprises a preferably U-shaped entraining device which is located in the passage and can automatically engage the projection of the bar pusher in that tube which registers with the work spindle, and drive means for moving the entraining device in the passage toward and away from the work spindle whereby the entrained pusher either advances a bar into the work spindle or is retracted in a direction toward the rear end of the respective tube. If the pushers are provided with tongs or analogous bar gripping means, they can move the bars toward and into or away from the work spindle.

The indexing means for the package of tubes preferably comprises an elongated tubular holder which is secured to and surrounds the package, and a ratchet-andpawl mechanism for rotating the holder. The axis of the holder preferably coincides with the aforementioned axis, and the axes of the tubes (which may but need not have identical external and/or internal diameters) preferably intersect a circle whose center is located on the axis of the holder. The package of tubes is indexible relative to the entraining device which is preferably secured to a chain, belt, cord, rope or an analogous endless flexible element having an elongated stretch extending lengthwise through the passage and being movable back and forth by a reversible electric motor or the like.

The novel features which are considered as characteristic of the invention are set forth in particular in the appended claims. The improved bar feeding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic side elevational view of a single-spindle bar machine which is associated with a bar feeding apparatus embodying the invention;

FIG. 2 is an enlarged fragmentary longitudinal vertical sectional view of the left-hand portion of the bar feeding apparatus shown in FIG. 1;

FIG. 3 is an enlarged fragmentary longitudinal vertical sectional view of the right-hand portion of the bar feeding apparatus shown in FIG. 1;

FIG. 4 is a transverse vertical sectional view as seen in the direction of arrows from the line IV—IV of FIG. 3;

FIG. 5 is an end elevational view of a first package of bar-receiving tubes; and FIG. 6 is a similar end elevational view of a modified package of bar-receiving tubes.

DESCRIPTION OF THE PREFERRED EMBODIMENTS

Referring first to FIG. 1, there is shown a program-operated bar machine of the type known as single-spindle automatic. The machine has a frame F for a carrier 10 which surrounds a hollow horizontal work spindle 12. The forward end portion of the bar which extends through and beyond the right-hand end of the spindle 12 can be treated by tools mounted in one or more of several radial tool slides 14, 16 and 18. The machine further comprises a main slide 20 which is movable in the axial direction of the work spindle 12 and carries an indexible turret 22 for a number of tools, not shown. The drive means for moving the cross slides 14, 16, 18 radially and for moving the main slide 20 axially of the work spindle 12 form no part of the present invention. Such drive means are controlled by the programming system of the machine.

In accordance with a feature of the invention, the machine of FIG. 1 is associated with an improved bar feeding apparatus 24 the major part of which is located behind the frame F (namely, at that side of the frame F which faces away from the main slide 20). The bar feeding apparatus 24 further includes an ejecting or expelling device 26 whose function is to remove from the axial bore of the work spindle 12 such remnants of bars which are not processed (converted into discrete articles) before the feeding apparatus 24 is caused to place a fresh or different bar into register with the work spindle. The ejecting device 26 can expel remnants of rods back into a tubular holder 42 of the bar feeding apparatus 24 and comprises a hydraulically or pneumatically operated cylinder 28 which can be mounted on the main slide 20 and has a piston rod 30 adapted to be introduced into the hollow work spindle 12 to move therein in a direction to the left, as viewed in FIG. 1, so as to expel the remnant of the previously treated bar stock back into the holder 42 of the bar feeding apparatus 24. The cylinder 28 is preferably mounted on the main slide 20 for sidewise movement into and from axial alignment of the piston rod 30 with the work spindle 12. When the remnant of a previously treated bar is to be expelled from the work spindle 12, the programming system of the machine causes the cylinder 28 to move the piston rod 30 into register with the work spindle, and the main slide 20 is thereupon advanced toward the adjacent front end or head of the spindle. This places the left-hand end of the piston rod 30 into close proximity of the spindle 12. The cylinder 28 thereupon causes its piston to perform a working stroke in a direction to the left, as viewed in FIG. 1, whereby the piston rod 30 penetrates into the work spindle 12 and expels the remnant of the previously treated bar. The piston rod 30 is thereupon retracted to the position shown in FIG. 1 and the apparatus 24 is then ready to introduce into the work spindle 12 the leading end of a fresh bar. The turret 22 of the main slide 20 (or a member which is connected thereto) may constitute a stop against which the front end face of freshly introduced bar stock abuts when the stock has been advanced sufficiently beyond the head of the work spindle 12 so that it can be properly treated by the tool or tools mounted on the slide 14, 16, 18 and/or 20.

The bar feeding apparatus 24 comprises two longitudinally spaced ground-engaging supporting members 34 and 36 the upper end portions of which respectively carry fixedly mounted or integral bearing members 38 and 40 for the respective end portions of the rotatable holder 42. The bearing members 38 and 40 are mounted in axial alignment with each other and the bearing member 40 is located behind the frame F of the machine. The manner in which the holder 42 is indexible in the bearing members 38 and 40 will be described with reference to FIGS. 3 and 4. The supporting members 34 and 36 are connected to each other by one or more horizontal tie rods 32. The end portions of the holder 42 are rotatable in needle bearings 44 and 46 (see FIGS. 2 and 3) which are respectively mounted in the bearing members 38 and 40.

The tubular holder 42 accommodates and is connected to a package or set 48 of elongated parallel tubular guides (hereinafter called tubes). As shown in FIG. 5, the package 48 may consist of six tubes 52 having the same length and identical internal and external diameters. The tubes 52 are welded or otherwise connected to each other in such a way that their axes intersect a circle 152 which is indicated in FIG. 5 by phantom lines and whose center is located on the axis of the holder 42. The manner in which the package 48 is secured to the holder 42 (for example, by means of one or more brackets) is not shown in the drawing. Each of the tubes 52 has a longitudinally extending slot 54 which communicates with an elongated passage or channel 50 defined by the package 48 and extending axially of the holder 42. As shown in FIG. 5, the package 48 consists of three pairs of identical tubes 52 which are located diametrically opposite each other with reference to the axis of the holder 42, and the slot 54 of one tube of each pair faces the slot 54 of the other tube of the same pair. In other words, the slots 54 of each pair of tubes 52 are located in a common plane which includes the axis of the holder 42 and the axes of the respective tubes 52. The length of each tube 52 preferably equals or closely approximates the length of the holder 42. The holder 42 of FIG. 5 can be used for storage of a supply of six discrete bars (not shown) each of which is received in a separate tube 52. When the front end of a tube 52 registers with the rear end portion of the work spindle 12 in the machine of FIG. 1, the rear ends of at least some of the remaining five tubes 52 are accessible for insertion of fresh bars. Thus, while the tube 52 which registers with the work spindle 12 is being relieved of its bar stock, the remaining five tubes either serve as a magazine for storage of spare bars or can be refilled with bars while the bar in the tube registering with the spindle 12 is being fed lengthwise in stepwise fashion. The bars in the tubes 52 shown in FIG. 5 may have (and normally do have) identical diameters, and they may but need not consist of the same material.

FIG. 6 illustrates a different holder 42' which also contains and supports a package 48' of six equidistant tubes 52'. However, in contrast to the tubes 52 of FIG. 5, at least some of the tubes 52' shown in FIG. 6 have different diameters. It will be noted that the axes of the tubes 52' shown in FIG. 6 intersect a circle 152' having its center on the axis of the holder 42'. The tubes 52' define an elongated centrally located passage or channel 50' and have longitudinally extending slots 54' corresponding to the slots 54 of FIG. 5. The distribution of tubes 52' in the holder 42' of FIG. 6 is such that the slot 54' of one tube 52' of each pair of tubes faces the slot 54' of the other tube of the same pair. The structure of FIG. 6 can be utilized for storage of differently dimensioned bars which may but need not consist of the same material.

It is further clear that the structure shown in FIG. 5 can be modified by utilizing a set of, for example, six tubes 52 having identical external diameters but different internal diameters so that such tubes can accommodate bars of different diameters. This would constitute a simple modification of the structure shown in FIG. 6.

Referring to FIG. 2, it will be noted that each of the tubes 52 is provided with a discrete bar pusher 56. Each bar pusher 56 comprises a cylindrical plug or plunger 58 which can be slidably fitted into the rear end portion of the respective tube 52 and has a flat radial projection or lug 60 which extends through and beyond the respective slot 54 and into the centrally located channel 50. The bar pushers 56 can be readily withdrawn, either by hand or by automatic means, so as to permit the introduction of fresh bars into the respective tubes 52.

The bar feeding apparatus 24 further comprises an advancing or shifting unit 62 which serves to transport selected bar pushers 56 in the respective tubes 52, either in a direction toward or in a direction away from the rear d portion of the work spindle 12. The shifting unit 62 comprises an endless flexible element here shown as a link chain 68 which is trained over a rear sprocket wheel 66 (FIGS. 1 and 2) mounted on the rear bearing member 38 and a front sprocket wheel 64 (FIG. 1) mounted on the front bearing member 40. The upper stretch of the endless chain 68 is guided in a pipe 70 which is mounted in the upper portions of the bearing members 38 and 40. The lower stretch of the chain 68 extends through the channel 50 in the central portion of the holder 42 and carries a motion transmitting or entraining device 72 best shown in FIG. 2. This entraining device is a substantially U-shaped member having two spaced apart downwardly extending legs 74 and 76 separated by a distance which at least equals the length of a projection 60, as considered in the longitudinal direction of the holder 42. In the embodiment which is illustrated in the drawing, the holder 42 or 42' maintains the lowermost tube 52 or 52' of the package 48 or 48' in register with the work spindle 12. Consequently, the mounting of the entraining device 72 shown in FIG. 2 is such that its legs 74 and 76 straddle the projection 60 of the bar pusher 56 in the tube 52 which registers with the work spindle 12. When properly inserted into the respective tubes 52, the remaining pushers 56 are preferably held in such positions that their projections 60 are located in a common plane with the projection 60 which is engaged by the entraining device 72. (Such an adjustment of the bar pushers 56 can be effected e.g. by means of a conventional adjusting means not shown.) This renders it possible that, when the holder 42 is automatically indexed to place another tube 52 into register with the work spindle 12, the projection 60 of the bar pusher 56 in such other tube 52 is automatically located in an optimum position for movement with the entraining device 72. The sprocket wheel 66 on the bearing member 38 is driven by a chain or belt 80 which is trained over a sprocket wheel or pulley on the output shaft of a reversible electric motor 78 mounted on the rear supporting member 34 or directly on the rear bearing member 38 (see FIG. 2). The motor 78 is preferably controlled directly by the programming system of the machine shown in FIG. 1. Thus, the programming system can cause the chain 68 to transport the entraining device 72 in a direction to the right or in a direction to the left, as viewed in FIGS. 1 or 2, so as to transport the respective bar pusher 56 toward or away from the work spindle 12. Assuming that the lowermost tube 42 of FIG. 2 registers with the work spindle 12, the motor 78 can drive the chain 68 intermittently so as to move the entraining device 72 in a direction to the right and to advance the device 72 by steps of such length as is necessary to move predetermined lengths of bar stock in the lowermost tube 52 beyond the right-hand end of the work spindle 12, as viewed in FIG. 1. The head of the spindle 12 comprises suitable clamping or engaging means which thereupon engages and holds the bar against relative lengthwise or angular movement during treatment by the tool or tools mounted in the slide 14, 16, 18 and/or 20. When the stock in the lowermost tube 52 of FIG. 2 is consumed, the motor 78 causes the entraining device 72 to reassume the starting or neutral position shown in FIG. 2 and to thus return the corresponding bar pusher 56 to its retracted or starting position. The clamping means at the forward end of the work spindle 12 is opened automatically before the motor 78 causes a selected pusher 56 to advance the bar in the respective tube 52 forwardly through and beyond the work spindle. As stated before, the turret 22 on the main slide 20 may constitute or it may comprise stop means for arresting the bar in the tube 52 which registers within the work spindle 12 in the foremost position in which the front end portion of the bar can be converted into an article which is thereupon separated from the remainder of the bar in a manner not forming part of this invention and well known from the art of chucking and bar machines. While the forward transport of the entraining device 72 preferably takes place stepwise, the rearward transport of the device 72 back to the postion of FIG. 2 is preferably effected in a single operation so that the bar filling apparatus 24 loses little time in returning a bar pusher 56 to the starting position shown in FIG. 2. It is also within the scope of the invention to use the entraining device 72 as a means for transporting the selected bar pusher 56 by a single step in a direction toward the frame F because the machine of FIG. 1 may be provided with its own feeding means (not shown) which is capable of advancing a bar stepwise as soon as the leading end of the bar has been introduced into the work spindle 12. In such machines, the entraining device 72 simply performs a single step in a direction to the right, as viewed in FIG. 2, and can be immediately returned back to the retracted position. The holder 42 cannot be indexed before the bar in the tube 52 which registers with the work spindle 12 is consumed or retracted into the tube. As soon as the trailing end of such bar has been introduced into the work spindle 12, the holder 42 can be indexed so as to place another tube 52 with a fresh bar therein into register with the spindle. The remnant of the previously treated bar can be automatically expelled, either back into the holder 42 or forwardly beyond the head of the work spindle 12.

The program of the machine can be changed upon consumption of a complete bar. Thus, prior to indexing of the holder 42, the programming system can change the number and/or types of tools which are about to treat a fresh bar to convert it into a series of articles which may but need not be identical with the articles of the preceding series. As mentioned above, fresh bars can be introduced into empty tubes 52 or 52' by hand or by an automatic or semiautomatic refilling mechanism. A consumed bar can be followed by a bar having identical dimensions and/or consisting of the same material, or by a bar whose diameter and/or material is different.

The indexing mechanism for the holder 42 or 42' is shown at 82. This indexing mechanism is preferably controlled by the programming system for the machine and serves to rotate the holder 42 or 42' as long as is necessary in order to place successive or selected tubes 52 or 52' into axial alignment with the work spindle 12. In the illustrated embodiment, the indexing mechanism 82 comprises a sleeve 84 which is integral with or fixedly secured to the front end portion of the holder 42 (see FIG. 3) and is surrounded by the antifriction bearing 46 in the front bearing member 40. The front end portion of the sleeve 84 has an annular external flange 86 whose peripheral surface is provided with a number of notches 88 (see FIG. 4), one for each tube 52 in the holder 42. The flange 86 constitutes a simple ratchet wheel and is surrounded by a pinion here shown as a ring gear 90 which is rotatable relative to the holder 42 and carries a pivotable coupling element in the form of a pawl 94 which is biased against the flange 86 by a helical spring 92. The configuration of the pallet 95 of the pawl 94 and of the notches 88 is such that, when the pallet 95 is forced into the adjoining notch 88, the holder 42 will rotate with the pinion 90 when the latter is rotated in a counterclockwise direction, as viewed in FIG. 4, but that the pallet 95 will enter into and move beyond the notches 88 when the pinion 90 is driven in a clockwise direction. The means for rotating the pinion 90 back and forth comprises a vertical toothed rack 96 which is rigid or integral with a piston rod 98 secured to a piston 100 in a double-acting hydraulic or pneumatic cylinder 99. The valves (not shown) which regulate the admission of a pressurized fluid into and the evacuation of fluid from the chambers of the cylinder 99 are controlled by the programming system of the machine. The pawl 94 is adjacent to the peripheral surface of the flange 86 and its pallet 95 rides along such surface when it does not extend into one of the notches 88. As shown in FIG. 4, the rack 96 moves upwardly when the pinion 94 rotates the holder 42, and the gear 94 can rotate relative to the sleeve 84 when the piston rod 98 is being retracted into the cylinder 99. The arrangement is preferably such that the holder 42 is indexed through exactly 60° in response to completion of a working (upward) stroke of the piston rod 98 because the holder 42 is assumed to contain a package 48 of six identical tubes 52. When the indexing mechanism 82 is in operation, the entraining device 72 dwells in the position of FIG. 2 so that it is ready to advance the pusher 56 for the tube 52 which registers with the work spindle 12 as soon as the indexing operation is completed.

It will be noted that, if the introduction of fresh bars into the tubes 52 or 52' is carried out by an automatic mechanism, the programming system of the bar machine can control all phases of operation of the feeding apparatus 24 including refilling of tubes 52 or 52', indexing of the holder 42 or 42', the transport of pushers 56 to and from the normal positions shown in FIG. 2, and the actuation of the ejecting device 26. The placing of successive or selected bars into register with the work spindle 12 consumes very little time so that the machine can produce a large number of articles per unit of time. This is attributed to the provision of the shifting unit 62 which comprises a single entraining device 72 and to the provision of an indexing mechanism 82 which need not be manipulated by hand. The holder 42 or 42' can be considered to constitute an advantageous but optional component part of the indexing mechanism 82 since the package 48 or 48' of tubes 52 or 52' can be directly connected with the flange or ratchet wheel 86 and the holder 42 or 42' omitted. Also, the link chain 68 can be replaced with a belt, cord, cable or another suitable endless flexible element. The plungers 58 of the bar pushers 56 can be provided with suitable tongs or with otherwise constructed gripping means (not shown) which can engage the adjacent rear ends of bars in the respective tubes 52 or 52' to positively move the bars forwardly or rearwardly. An advantage of such gripping means is that the ejecting device 26 can be dispensed with.

The cross-sectional area of the passage 50 or 50' is selected in such a way that the holder 42 or 42' can be rotated while the position of the entraining device 72 remains unchanged. This insures that, when all of the projections or lugs 60 are located at the same distance from the front end of the holder 42 or 42' (see FIG. 2), the projection 60 of the pusher 56 in that tube 52 or 52' which registers with the work spindle 12 is automatically received in the space between the legs 74, 76 of the entraining device 72 to insure that the thus received projection 60 is ready to share all forward and rearward movements of the entraining device as long as the respective tube 52 or 52' remains in register with the work spindle.

The improved bar feeding apparatus 24 need not be provided with a discrete magazine for bar stock and/or with a complex transfer unit for delivery of bars from the magazine into the tubes 52 and 52' because those tubes which do not register with the work spindle 12 constitute an effective magazine for spare bars. The pulley 66 at the rear end of the holder 42 or 42' can be readily mounted in such a way that it affords access to several bar pushers 56 in order to allow for refilling of empty tubes 52 or 52' while the entraining device 72 transports that bar which is located in the tube which registers with the work spindle 12. A pusher 56 which has been returned to the position shown in FIG. 2 is automatically disengaged from the entraining device 72 when the holder 42 or 42' is indexed because the distance between the lgs 74, 76 is long enough to allow for angular movement of projections 60 into and from register with the entraining device. In other words, the pusher 56 in a tube which has been moved into register with the work spindle 12 is engaged by the entraining device 72 in automatic response to indexing of the holder 42 or 42', i.e., in automatic response to disengagement of another pusher 56 from the device 72. This renders it possible to control the operation of the shifting unit 62 by the programming system of the machine without necessitating any manual adjustments.

If the machine is to process six consecutive bars which are stored in the tubes 52 of the holder 42 shown in FIG. 5, the six tubes 52 are loaded with bars and the six pushers 56 are inserted so that their projections 60 are located in a common plane making a right angle with the axis of the holder 42 and including the space between the legs 74, 76 of the entraining device 72. The projection 60 of the pusher 56 in the tube 52 which registers with the work spindle 12 is then received in the space between the legs 74, 76 and the operation of the shifting unit 62 and indexing means 82 can be controlled by the programming system of the machine without necessitating any attention on the part of the attendants. Thus, when the processing of a bar is completed, the entraining device 72 is retracted to the position of FIG. 2 by operating the motor 78 in reverse, and the motor 78 in then arrested automatically before the indexing means 82 is started to place a loaded tube 52 into register with the work spindle 12. The projection 60 of the pusher 56 in the empty tube 52 which moves out of register with the spindle 12 is automatically removed from the space between the legs 74, 76 in response to indexing of the holder 42, and the projection 60 of the pusher 56 in a loaded tube 52 which is brought into register with the spindle 12 automatically enters such space to make the feeding apparatus 24 ready to deliver into the work spindle a fresh bar which is converted into a series of articles by one or more tools held in their holders on the slide 14, 16, 18 and/or 20. All of the tubes 52 or 52' can be loaded simultaneously, or such tubes can be refilled individually, for example, immediately after they move out of axial alignment with the work spindle 12. The projections 60 of the pushers 56 are preferably flat and may but need not have identical dimensions, as long as they can enter the space between the legs 74, 76 of the entraining device 72 in response to indexing of the holder 42 or 42'. The clearance between the legs 74, 76 and a projection 60 therebetween is preferably small, i.e., just sufficient to insure that the projections 60 can readily enter and leave the space between the legs 74, 76 in response to indexing of the holder 42 or 42'.

It is further within the purview of the invention to replace the illustrated indexing means 82 with a suitable servomotor which can index the holder 42 or 42' through angles of desired magnitude in order to place successive or selected tubes 52 or 52' into register with the work spindle 12. The illustrated indexing means is designed to rotate the holder 42 or 42' through exactly 60° in response to each upward stroke of the piston rod 98 and toothed rack 96. Such mode of operation is desirable when the holder 42 or 42' contains six tubes having identical diameters or six tubes whose diameters are not substantially different.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent Is set forth in the appended claims:

1. For use with a machine having at least one hollow work spindle, particularly with a program-operated single spindle automatic: a bar feeding apparatus for introducing bars into said work spindle, said apparatus comprising a package of parallel bar-receiving tubes each having a front end and a rear end, said tubes forming an annulus surrounding an elongated passage and each having a longitudinally extending slot communicating with said passage; indexing means for rotating said package about an axis extending lengthwise through said passage between a plurality of positions in each of which the front end of a different tube registers with said work spindle; a plurality of bar pushers, one for each of said tubes and each movable in the respective tube to push a bar therein toward and into the work spindle when the respective tube registers with said work spindle, each of said pushers having a projection provided with a part extending through said slot of the respective tube and into said passage; and shifting means for moving the pusher in the tube which registers with said work spindle, said shifting means comprising drive means including an endless flexible element having an elongated stretch extending axially through said passage beyond opposite axial ends of the same, means for moving said stretch lengthwise of said passage, and an entraining device connected to and movable with said stretch lengthwise of and through said passage and having abutment portions arranged to engage said part of the projection on the pusher of that tube which registers with said work spindle, said package of tubes being indexable relative to said stretch and to said entraining device.

2. A bar feeding apparatus as defined in claim 1, wherein said indexing means comprises a hollow tubular holder connected with and surrounding said package and having an axis which coincides with said first mentioned axis, said indexing means further comprising means for rotating said holder about said axis thereof.

3. A bar feeding apparatus as defined in claim 2, wherein the axes of said tubes intersect a circle having its center located on the axis of said holder.

4. A bar feeding apparatus as defined in claim 1, wherein at least one of said drive means and indexing means is controlled by the programming system of the machine.

5. A bar feeding apparatus as defined in claim 1, wherein said abutment portions are two legs spaced apart in the longitudinal direction of said passage and defining a space for reception of the projection on the bar pusher in that tube which registers with said work spindle so that a projection in said space can be moved toward said front end of the respective tube by one of said legs and away from said work spindle by the other leg of said entraining device.

6. A bar feeding apparatus as defined in claim 5, wherein said projections are substantially flat lugs.

7. A bar feeding apparatus as defined in claim 1, further comprising ejector means having an expelling element movable into register with that end of said work spindle which is remote from said package, and means for moving said element into said work spindle to thereby expel a bar back into that tube which registers with said work spindle.

8. For use with a machine having at least one hollow work spindle, particularly with a program-operated single-spindle automatic; a bar feeding apparatus for introducing bars into said work spindle, said apparatus comprising a package of parallel bar-receiving tubes each having a front end and a rear end, said tubes forming an annulus surrounding an elongated passage and each having a longitudinally extending slot communicating with said passage; indexing means for rotating said package about an axis extending lengthwise through said passage between a plurality of positions in each of which the front end of a different tube registers with said work spindle; a plurality of bar pushers, one for each of said tubes and each movable in the respective tube to push a bar therein toward and into the work spindle when the respective tube registers with said work spindle, each of said pushers having a projection extending through said slot of the respective tube and into said passage; shifting means for moving the pusher in the tube which registers with said work spindle, said shifting means comprising an entraining device located in said passage, and arranged to engage the projection of the pusher in that tube which registers with said work spindle, the drive means for moving said entraining device in said passage toward and away from said work spindle; ejector means having an expelling element movable into register with that end of said work spindle which is remote from said package; and means, comprising a fluid-operated cylinder and piston assembly, for moving said element into said work spindle to thereby expel a bar back into that tube which registers with said work spindle.

9. For use with a machine having at least one hollow work spindle, particularly with a program-operated single-spindle automatic; a bar feeding apparatus for introducing bars into said work spindle, said apparatus comprising a package of parallel bar-receiving tubes each having a front end and a rear end, said tubes forming an annulus surrounding an elongated passage and each having a longitudinally extending slot communicating with said passage; indexing means for rotating said package about an axis extending lengthwise through said passage between a plurality of positions in each of which the front end of a different tube registers with said work spindle; a plurality of bar pushers, one for each of said tubes and each movable in the respective tube to push a bar therein toward and into the work spindle when the respective tube registers with said work spindle, each of said pushers comprising bar gripping means and having a projection extending through said slot of the respective tube and into said passage; and shifting means for moving the pusher in the tube which registers with said work spindle, said shifting means comprising an entraining device located in said passage, and arranged to engage the projection of the pusher in that tube which registers with said work spindle, and drive means for moving said entraining device in said passage toward and away from said work spindle.

10. For use with a machine having at least one hollow work spindle, particularly with a program-operated single-spindle automatic; a bar feeding apparatus for introducing bars into said work spindle, said apparatus comprising a package of parallel bar-receiving tubes each having a front end and a rear end, said tubes forming an annulus surrounding an elongated passage and each having a longitudinally extending slot communicating with said passage; indexing means, comprising a ratchet-and-pawl mechanism for rotating said package about an axis extending lengthwise through said passage between a plurality of positions in each of which the front end of a different tube registers with said work spindle; a plurality of bar pushers, one for each of said tubes and each movable in the respective tube to push a bar therein toward and into the work spindle when the respective tube registers with said work spindle, each of said pushers having a projection extending through said slot of the respective tube and into said passage; and shifting means for moving the pusher in the tube which registers with said work spindle, said shifting means comprising an entraining device located on said passage, and arranged to engage the projection of the pusher in that tube which registers with said work spindle, and drive means for moving said entraining device in said passage toward and away from said work spindle.

11. A bar feeding apparatus as defined in claim 10, wherein said mechanism comprises a ratchet wheel secured to and rotatable with said package about said axis, a pinion coaxial with said ratchet wheel and having a spring-biased pawl arranged to rotate said ratchet wheel when said pinion is rotated in a predetermined direction, a toothed rack meshing with said pinion, and means for moving said rack.

12. A bar feeding apparatus as defined in claim 11, wherein said means for moving said rack comprises a double-acting cylinder and piston assembly and said ratchet wheel has a plurality of pawl-receiving notches, one for each of said tubes.

13. A bar feeding apparatus as defined in claim 1, wherein at least two of said tubes have identical internal diameters.

14. A bar feeding apparatus as defined in claim 1, wherein at least two of said tubes have different internal diameters.

* * * * *